United States Patent [19]

Varney

[11] Patent Number: 4,502,529
[45] Date of Patent: Mar. 5, 1985

[54] HEAT RECOVERY SYSTEM

[76] Inventor: Paul R. Varney, Jackson Lane, Barre, Mass. 01005

[21] Appl. No.: 307,299

[22] Filed: Sep. 30, 1981

[51] Int. Cl.³ .............................................. F24H 3/00
[52] U.S. Cl. ..................................... 165/47; 165/169; 285/41
[58] Field of Search .................... 285/41, 131, 132; 165/47, 169

[56] References Cited

U.S. PATENT DOCUMENTS

| | | | |
|---|---|---|---|
| 744,111 | 11/1903 | Roderwald | 165/169 |
| 780,736 | 1/1905 | Stack . | |
| 1,038,113 | 9/1912 | Garrard . | |
| 1,581,920 | 4/1926 | Dargent | 285/131 X |
| 1,910,392 | 5/1933 | Jacocks et al. . | |
| 1,916,888 | 7/1933 | Malott, Jr. . | |
| 2,080,229 | 5/1937 | Ray | 122/20 |
| 2,166,188 | 7/1939 | Turner | 165/169 X |
| 2,446,289 | 8/1948 | Love et al. | 165/47 X |
| 2,621,903 | 12/1952 | Cohler | 165/169 X |
| 2,650,427 | 9/1953 | Mathiesen | 165/169 X |
| 2,650,800 | 9/1953 | Taylor | 165/47 X |
| 3,255,298 | 6/1966 | Meyer | 174/8 |
| 3,295,503 | 1/1967 | Ranebo | 122/20 |
| 3,409,074 | 11/1968 | Wagner et al. | 165/169 X |
| 4,045,056 | 8/1977 | Kandakov et al. | 285/41 |
| 4,122,801 | 10/1978 | Burns | 122/20 |
| 4,150,787 | 4/1979 | Braathen | 237/1 |
| 4,157,706 | 6/1979 | Gaskill | 126/271 |
| 4,202,406 | 5/1980 | Avery . | |
| 4,372,372 | 2/1983 | Hunter | 165/47 |

FOREIGN PATENT DOCUMENTS

| | | | |
|---|---|---|---|
| 1082090 | 5/1960 | Fed. Rep. of Germany | 285/302 |
| 957579 | 5/1964 | United Kingdom | 165/169 |

Primary Examiner—Thomas F. Callaghan
Attorney, Agent, or Firm—Blodgett & Blodgett

[57] ABSTRACT

A system for transferring heat from outgoing domestic waste liquids to incoming water, including a helical tube forming a wall of the system and carrying the incoming water.

3 Claims, 2 Drawing Figures

HEAT RECOVERY SYSTEM

BACKGROUND OF THE INVENTION

In the attempt to conserve energy there is one source of wasted energy that is often forgotten and neglected. This is the heat contained in the water of a domestic sewer and waste water system. While heat-exchangers have been developed for transferring heat from many normal sources of heat waste to other areas of the home, such heat-exchange units are not particularly adaptable to use with waste water. This is because waste water contains solids that are of such a diverse and non-homogeneous character. Attempts to operate conventional heat-exchange units for the purpose of transferring heat from waste water and sewage to incoming water have been less than effective because of the coating and sludging character of the waste. These and other difficulties experienced with the prior art devices have been obviated in a novel manner by the present invention.

It is, therefore, an outstanding object of the invention to provide a heat recovery system particularly adapted to use with domestic waste water.

Another object of this invention is the provision of a heat-exchange unit in which the primary liquid is subjected to considerable agitation.

A further object of the present invention is the provision of a heat-exchange system in which one of the liquids is carried in a very long flow path about a short path of flow of the other liquid.

It is another object of the instant invention to provide a heat-exchange system for use where temperature differential between the primary and secondary fluids is low.

A still further object of the invention is the provision of a heat recovery system for insertion in a domestic sewer system, which unit is simple and rugged in character, which is inexpensive to manufacture, and which is capable of a long life of useful service with a minimum of maintenance.

With these and other objects in view, as will be apparent to those skilled in the art, the invention resides in the combination of parts set forth in the specification and covered by the claims appended hereto.

SUMMARY OF THE INVENTION

In general, the invention consists of a heat recovery system having an entrance pipe fitting that receives a heat-containing waste liquid and an exit pipe fitting for emitting the waste substance. It includes a coil of pipe formed from a metal of high thermal conductivity through which passes cold water on its way to a conventional water heater. The turns of the coil are helically arranged and in contact with one another to form a tube. To one end of the tube is connected the entrance pipe fitting and the other end of the tube is connected the exit pipe fitting.

More specifically, the two pipe fittings and the coil of pipe are joined together by sealant in leak-free relationship. Two pipe fittings have inner bores of the same diameter and the innermost surfaces of the coil of pipe are tangential to an imaginary cylindrical surface joining the two bores and of the same diameter.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
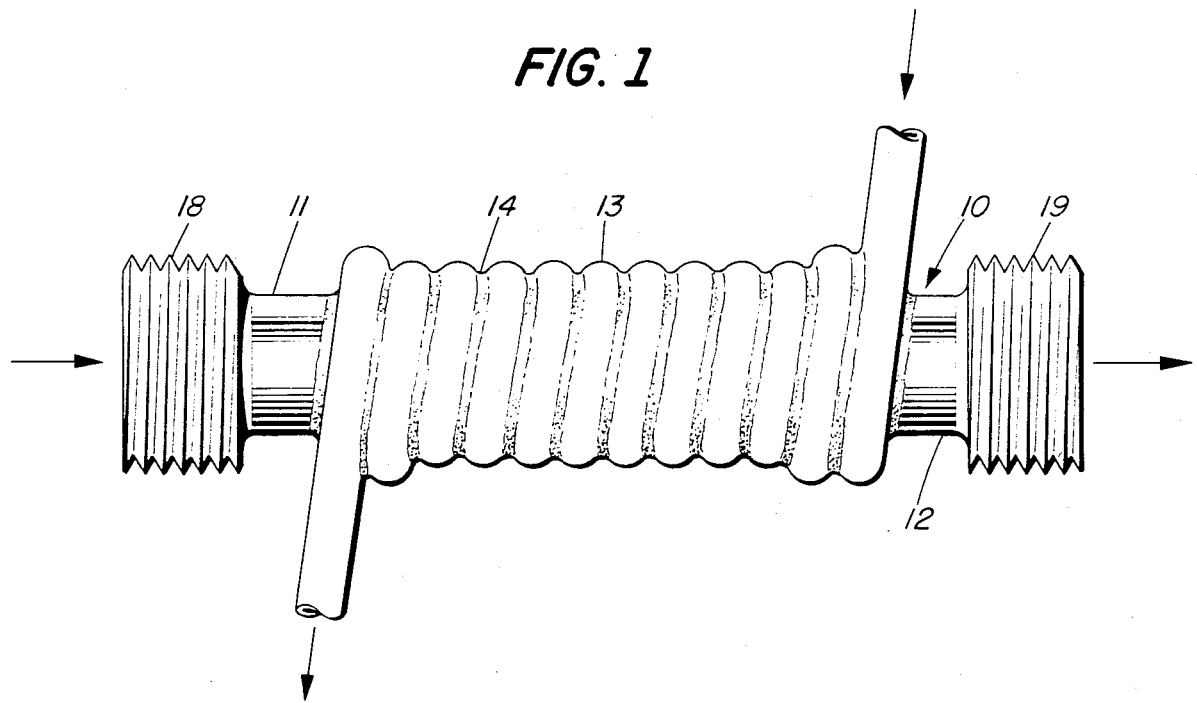
FIG. 1 is a front elevational view of a heat recovery system embodying the principles of the present invention.
Figure 2:
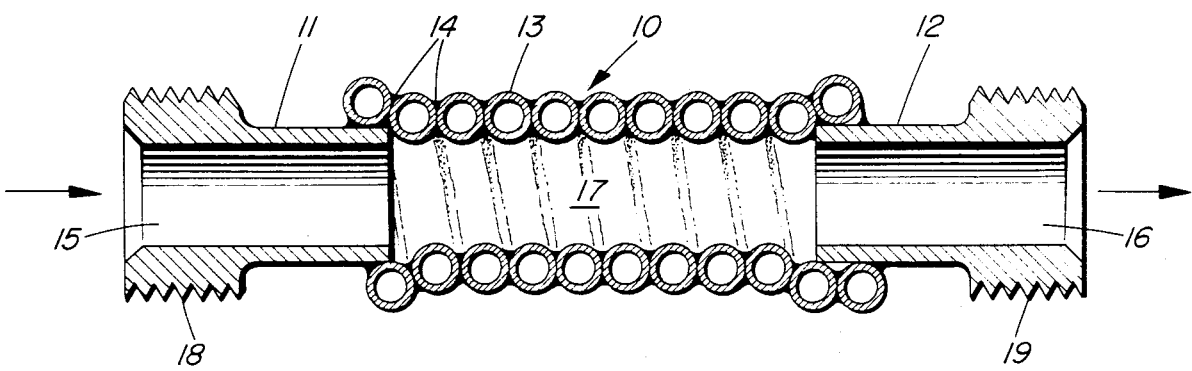
FIG. 2 is a vertical sectional view of the system.

Referring first to FIG. 1, which best shows the general features of the invention, the recovery system, indicated generally by the reference numeral 10, is shown as having an entrance pipe fitting 11, adapted to receive a heat-containing flowable fluid, such as the waste of a domestic establishment. Located in alignment, but spaced from the entrance pipe fitting is an exit pipe fitting 12 from which the waste substance is emitted. Joining the entrance pipe fitting 11 and the exit pipe fitting 12 is a coil 13 of pipe. The coil is formed from a metal of high thermal conductivity which, in the preferred embodiment, is copper. Cold water passes through the pipe forming this coil on its way to a conventional water heater. The turns of the coil 14 are helically arranged and are in contact with one another to form a tube. One end of the tube is attached to the entrance pipe fitting 11 and the other end is connected to the exit pipe fitting 12. The two pipe fittings and the coil of pipe are joined together by a sealant 14 in leak-free relationship.

The pipe fitting 11 has an inner bore 15, while the pipe fitting 12 has an upper bore 16, these bores having the same diameter. The inner surfaces of the coil 14 are tangential to an imaginary cylindrical surface joining the bores 15 and 16 and having the same diameter.

The fitting 11 is provided with a threaded portion 18 and is configured to form part of a conventional pipe union by which it is attached into the rest of the waste water system. Similarly the pipe fitting 12 is provided with a threaded portion 19 that forms a portion of a standard pipe union for attachment to the waste water system.

In the preferred embodiment, the pipe from which the coil is formed is copper and the sealant 14 is solder. However, it is suggested that the coil might very well be formed of aluminum in which case the sealant is of another nature. In some cases, it may be desirable to form the pipe of steel and to use brazing as the sealant.

The operation and advantages of the present invention will now be readily understood in view of the above description. When the fittings 11 and 12 are connected by unions into the waste water system, the waste water passes through the bore 15 and the bore 16 as well as the inner surfaces 17 of the coil 13. The entrance end of the coil 13 is connected to the cold water pipe arriving from the water meter, while the exit end passes to a conventional water heater. Heat in the waste water passing from the fitting 11 to the fitting 12 transfers heat not only into the fittings, but also into the coil 13 where it is absorbed by the cold entrance water passing through the coil. Since the coil has many turns, the cold water has considerable opportunity to be heated before it leaves the coil. The temperature of the waste water is reduced and transferred to the cold incoming water.

It can be seen that the present device is a simple and inexpensive way of conserving energy by preheating the incoming cold water. The device can easily be removed by disconnecting the unions so that the internal surfaces can be cleaned to give good heat transfer into the incoming water.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Heat recovery system, comprising:
   (a) an entrance pipe fitting for receiving a flowable heat-containing waste substance, said entrance pipe fitting having an entrance opening and an exit opening,
   (b) an exit pipe fitting for emitting the waste substance, said exit pipe fitting having an exit opening and an entrance opening spaced from the exit opening of said entrance pipe fitting, and
   (c) a coil of cylindrical tubing for conducting cold water on its way to a conventional water heater, the turns of the coil tubing being helically arranged and in sealing contact to form a conduit tube, one end of said coil being sealably connected to the exit opening of said entrance pipe fitting and the other end of said coil being sealably connected to the entrance opening of said exit pipe fitting, said conduit tube having an inner surface which defines a connecting passageway for conducting said waste substance from said entrance pipe fitting to said exit pipe fitting and isolated from said passageway, said inner surface having a helical groove generated about the longitudinal axis of the conduit so as to define a helical convex ridge between helical turns of said groove.

2. Heat recovery system as recited in claim 1, wherein said coil tubing is formed from a metal of high thermal conductivity.

3. Heat recovery system as recited in claim 1, wherein the two pipe fittings have inner bores of the same diameter and the inner surfaces of the coil of tubing which constitute said conduit tubing are tangential to an imaginary cylindrical surface joining the two bores and of the same diameter.

* * * * *